UNITED STATES PATENT OFFICE.

WILLIAM GLUYAS, OF SAN FRANCISCO, CALIFORNIA, ASSIGNOR TO HIMSELF AND WM. H. O'NEILL, OF SAME PLACE.

COMPOSITION FOR PREPARING GOLD AND SILVER ORES FOR AMALGAMATION.

Specification forming part of Letters Patent No. 25,787, dated October 11, 1859.

*To all whom it may concern:*

Be it known that I, WILLIAM GLUYAS, of the city and county of San Francisco, and State of California, have invented a new and useful Composition for Preparing Gold and Silver Ores or Tailings for Amalgamation, which I call "Gluyas' Caustic Alkali," of which the following is a specification.

The nature of the composition is such that by the use of the same, as hereinafter described, all of the precious metal is saved.

To enable others skilled in the art to make and use my invention, I will proceed to describe the composition and the manner of using it.

The mixture consists of the following articles and proportions, viz: one gallon of water, one-half pound of unslaked lime, one-half pound of common salt, and one and a half pound of soda-ash. The ingredients are contained in bottles, which are herewith deposited in the Patent Office. The bottles are marked 1, 2, 3, and 4. No. 1 is lime, No. 2 is salt, No. 3 is soda-ash, and No. 4 is a sample of the composition prepared for use.

Manner of use: The mixture should be boiled, after which the pulverized gold or silver ore or tailings should be placed in a kettle or pan with quicksilver. The mixture should then be let on, and the whole brought to a boiling state, the contents of the pan being constantly agitated and boiling water added thereto as required. After sufficient time has elapsed the contents of this pan are run off into another kettle or pan in which is boiling water, and is there kept in agitation. From thence it passes into an amalgamator containing quicksilver.

I claim—

The mixture or composition hereinbefore described used with pulverized ores or tailings, the whole being brought to a boiling-heat, and being constantly agitated, thereby preparing the precious metals for a more perfect amalgamation with quicksilver, and for that I desire to secure letters Patent.

WM. GLUYAS.

Witnesses:
CHAS. R. BOND,
C. J. BRENHAM.